United States Patent
DiFonzo et al.

(10) Patent No.: US 7,711,321 B2
(45) Date of Patent: May 4, 2010

(54) SYSTEM FOR CONCURRENT MOBILE TWO-WAY DATA COMMUNICATIONS AND TV RECEPTION

(75) Inventors: Daniel F. DiFonzo, Rockville, MD (US); Danny Spirtus, Holon (IL); Mario Gachev, Sofia (BG); Yoel Gat, Shoresh (IL)

(73) Assignee: RaySat Antenna Systems, L.L.C., Vienna, VA (US)

( * ) Notice: Subject to any disclaimer, the term of this patent is extended or adjusted under 35 U.S.C. 154(b) by 0 days.

(21) Appl. No.: 12/061,712

(22) Filed: Apr. 3, 2008

(65) Prior Publication Data
US 2008/0189747 A1 Aug. 7, 2008

Related U.S. Application Data

(63) Continuation of application No. 10/925,937, filed on Aug. 26, 2004, now Pat. No. 7,379,707.

(51) Int. Cl.
*H04B 7/185* (2006.01)

(52) U.S. Cl. .......... 455/12.1; 455/11.1; 455/13.1; 455/456.1; 455/575.9; 343/711

(58) Field of Classification Search .......... 455/575.9, 455/11.1, 13.2, 13.3, 13.1, 430, 431, 456.1, 455/457, 82, 98, 427; 342/372, 81, 157, 342/158, 359, 374, 75, 77, 79, 80; 725/69, 725/64, 70, 63; 343/771, 711, 770, 776, 343/713

See application file for complete search history.

(56) References Cited

U.S. PATENT DOCUMENTS

| | | | |
|---|---|---|---|
| 5,245,348 | A | 9/1993 | Nishikawa et al. |
| 6,191,734 | B1 | 2/2001 | Park |
| 6,377,211 | B1 | 4/2002 | Hsiung |
| 6,504,505 | B1 | 1/2003 | Yung |
| 6,549,164 | B2 | 4/2003 | Paschen et al. |
| 6,977,621 | B2 | 12/2005 | Kelly et al. |
| 2001/0055948 | A1 | 12/2001 | Ikeda et al. |
| 2002/0167449 | A1 | 11/2002 | Frazita |
| 2003/0097658 | A1 | 5/2003 | Richards |
| 2003/0181162 | A1 | 9/2003 | Matula |
| 2004/0087294 | A1 | 5/2004 | Wang |
| 2004/0180707 | A1 | 9/2004 | Barrett |

OTHER PUBLICATIONS

EP 05813740.7 Search Report, mail dated May 26, 2009.
Soon Ik Jeon et al., "Active Phased Array Antenna for Mobile Multimedia Services Via Satellite," Aerospace Conference Proceedings, 2000 IEEE Mar. 18-25, 2000, Piscataway, NJ, IEEE, vol. 5, Mar. 18, 2000, pp. 165-170 XP0105017164.

*Primary Examiner*—Sujatha Sharma
(74) *Attorney, Agent, or Firm*—Banner & Witcoff, Ltd.

(57) ABSTRACT

A low profile mobile in-motion antenna and transmit/receive terminal system for two-way "VSAT" type satellite communication using FSS service, preferably in Ku band, supporting at the same time TV signal reception from the same satellite or a separate DBS satellite located at the same or nearby geo-stationary orbital position.

20 Claims, 5 Drawing Sheets

FIG. 6

SYSTEM FOR CONCURRENT MOBILE TWO-WAY DATA COMMUNICATIONS AND TV RECEPTION

CROSS REFERENCE TO RELATED APPLICATIONS

This application is a continuation of U.S. application Ser. No. 10/925,937 filed Aug. 26, 2004 U.S. Pat. No. 7,379,707, entitled "System for Concurrent Mobile Two-way Data Communications and TV Reception, the entire contents of which are incorporated herein by reference.

BACKGROUND OF THE INVENTION

1. Field of the Invention

The present invention concerns a microwave antenna terminal applicable to two-way mobile in-motion communication systems using geostationary satellites, and capable of supporting concurrent two-way data transfer and satellite TV reception.

2. Description of the Related Art

Existing systems and technologies, which are known in the art provide for the following capabilities:
VSAT two-way system for fixed service.
VSAT two-way transportable systems.
Mobile transportable and in-motion low profile receive only antenna and receiver systems for satellite broadcast TV and data reception.
Phased array antenna technology.
Flat array antenna systems.

One disadvantage of existing two-way systems, whether fixed or transportable, is their considerable height and unattractive appearance, limiting applications and customer appeal for moving platforms. A further disadvantage is the inability of existing systems and technologies for land based vehicles to provide mobile systems with broad band two-way data communications, including Internet and telephone access, that would enhance communication capabilities for commercial, recreational and any other mobile-based activities, using a variety of vehicular transportation in both densely populated and remote locations. Yet another disadvantage is the inability of existing systems and technologies to provide mobile systems with a combination of concurrent two-way data communications and television reception capabilities for commercial, recreational and other activities.

As used herein, the term "transportable" refers to systems that may be moved by vehicles from one place to another, but wherein operation is limited to the case when the vehicle is parked, i.e. stationary. "Mobile" or "in-motion" refers to systems that may be operated while the vehicle is moving.

SUMMARY OF THE INVENTION

A low profile mobile in-motion antenna and transmit/receive terminal system for two-way data type communication using data service at frequencies in a first frequency band, supporting at the same time concurrent TV signal reception of signals broadcast in a second frequency band, such communication being with the same satellite or with two or more satellites located at the same or close geo-stationary orbital position. For purposes of the present invention, satellites at substantially the same orbital location would be within the beam width of the mobile in-motion antenna, typically within a range of 0 to 0.3 degrees of orbital location.

In particular, the present invention enables and facilitates the applications of broadband data communications and satellite TV reception at a wide variety of moving vehicles such as recreational vehicles (RVs), sport utility vehicles (SUVs), buses, trucks, trains, automobiles, boats, and even aircraft. For example, one application would enable passengers in a vehicle to make a wireless "always on" broadband connection to the Internet from a personal computer inside the vehicle at the same time that other passengers are watching satellite TV broadcasts from, for example, the DirecTV network. This could be done in a consumer vehicle and also in commercial vehicles such as buses and trains. In that case, passengers could open their laptop computers and perform customary Internet functions such as e-mail and Web browsing. Other passengers could be watching satellite TV.

In another example application, the two-way satellite connection and the Global Positioning System (GPS) information included with the invention system, which provides the location of the vehicle, could be interfaced with the vehicle's telematics system to provide up-to-date downloads of information for navigation, location of local hotels, restaurants, and local points of interest. The active two-way communication link could also be used to obtain real time emergency assistance where the vehicle's location would be communicated to the emergency assistance organization.

For commercial vehicles such as trains, buses and aircraft, the Internet connectivity enabled by the invention allows provision of wireless "hot spots" covering the inside of the moving vehicle. The satellite TV portion of the system could also be used to distribute programming to individual seats, if desired.

For commercial trucks, the invention combines vehicle location information and "always on" connectivity that may be used for dispatch and routing by a central authority.

BRIEF DESCRIPTION OF THE DRAWINGS

Embodiments of the invention are described below in detail with reference to the following drawings in which like reference numerals refer to like elements wherein.

TECHNICAL DESCRIPTION OF THE INVENTION

The following describes in detail exemplary embodiments of the invention, with reference to the accompanying drawings.

The claims alone represent the metes and bounds of the invention. The discussed implementations, embodiments and advantages are merely exemplary and are not to be construed as limiting the present invention. The description of the present invention is intended to be illustrative, and is not intended to limit the scope of the claims. Many alternatives, modifications and variations will be apparent to those skilled in the art.

The present invention comprises a terminal system alone or in combination with a low-profile antenna, that is suitable for use with a variety of vehicles, for in-motion satellite communications in support of concurrent two-way data transfer and satellite broadcast TV reception. With reference to the illustration in FIG. 1 of an exemplary system 100 in which the invention may be employed, a mobile vehicle 110 has mounted thereon a terminal system 120 that is adapted to communicate simultaneously with two satellites that are co-located in geostationary orbit. One satellite 130 is a direct broadcast satellite that provides television signals on a downlink at a frequency within a range assigned by an appropriate body, such as the Federal Communication Commission (FCC) in the U.S. or similar agency in Europe or other regions. A second satellite 140 is co-located with the first satellite and provides two-way data communication at uplink and down link frequencies that also are assigned by the FCC. As would be clear to one skilled in the art, a single satellite could provide both the television broadcast and two-way date communications services, and two or more satellites could be substantially co-located to provide such services. Effective communication from a single mobile in-motion terminal with multiple satellites would require the satellites to be within the beam width of the terminal antenna. In short, the features of the invention are not limited by the number of satellites engaged in the communication service.

Figure 1:
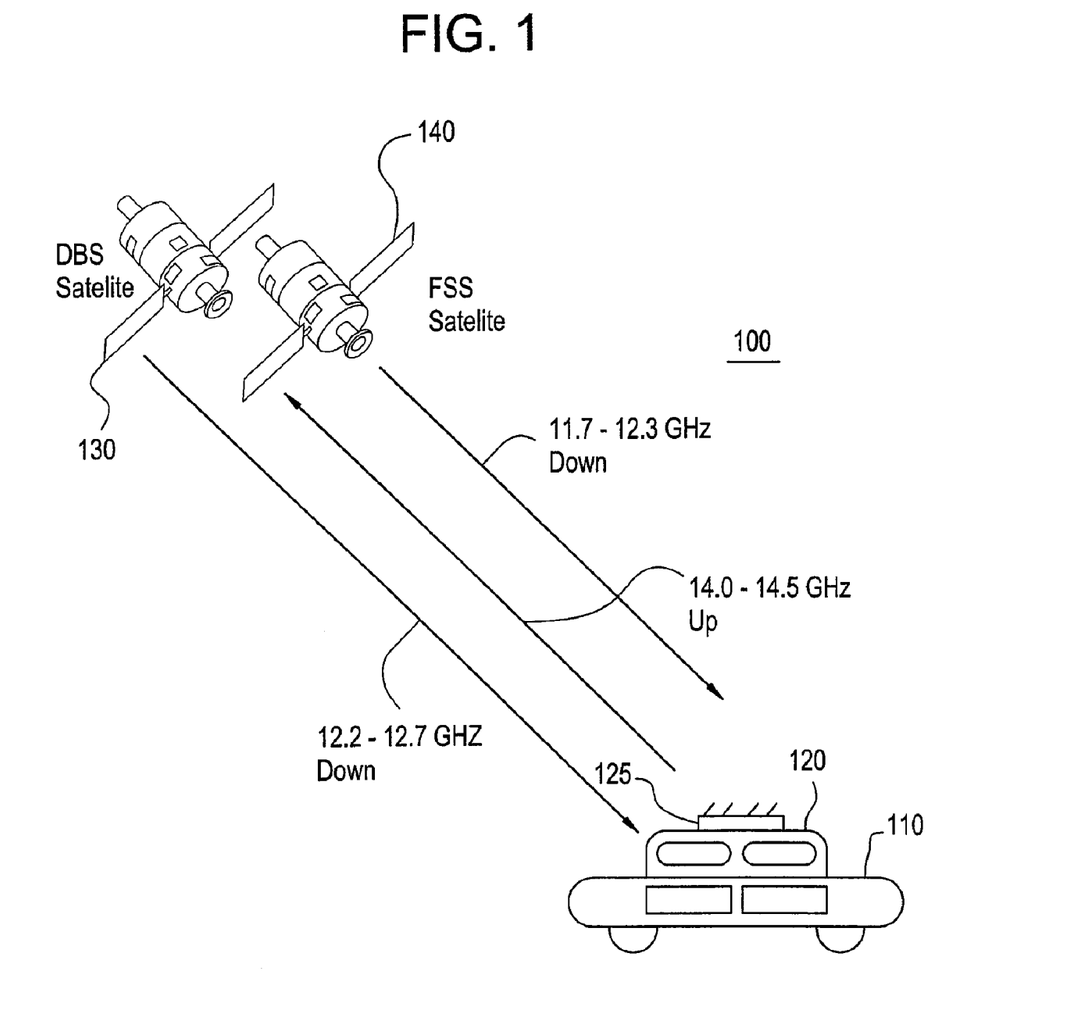
FIG. 1 is an illustration of a communications system with which the present invention is employed.

In an exemplary embodiment relevant to the U.S., two-way data communications is provided by using one or more satellites in the U.S. Fixed Satellite Service (FSS) frequency band of 11.7-12.2 GHz for reception (downlink or forward link) and 14.0-14.5 GHz for transmit (uplink or return link) and simultaneous TV programs reception in 12.2-12.7 GHz Direct Broadcast Satellite (DBS) or Broadcast Satellite Service (BSS) band from the same or close orbital location. The terminal system 120 includes an antenna 125 that is mounted on or into the roof of the vehicle and, preferably, has a low profile form that is attractive for application to mobile platforms, such as cars, sport utility vehicles (SUVs), vans, recreation vehicles (RVs), trains, buses, boats or aircraft. The lower profile facilitates terminal installation directly on or into the roof of the mobile platform, keeping the overall aerodynamic properties of the vehicle almost unchanged. The terminal system 120 also has a communications subsystem that is operative to provide the concurrent two-way data and television reception capability by appropriately processing the uplink and downlink signals at different frequency bands.

Figure 2A:
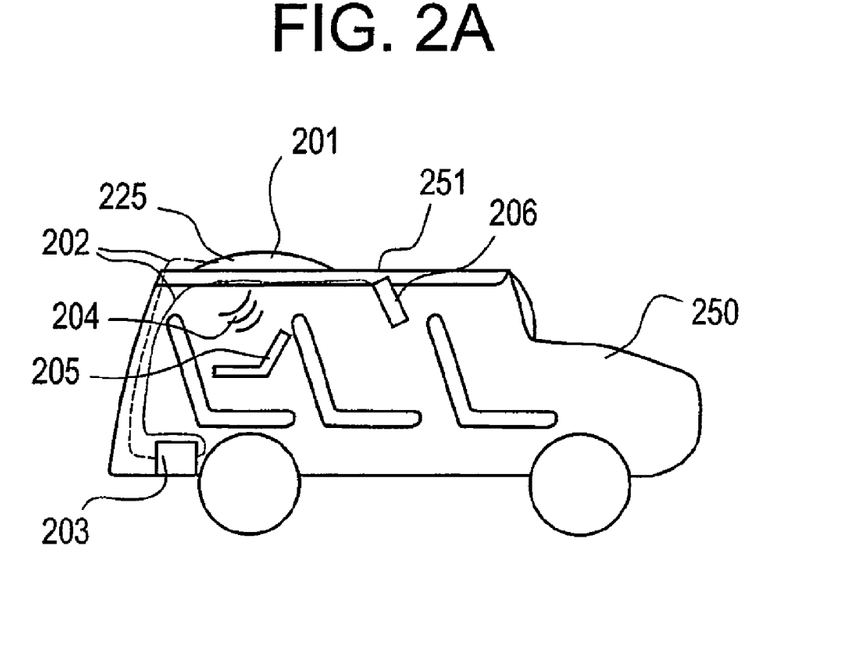
FIG. 2A is a cross section of a first embodiment of a transmit/receive low profile terminal in accordance with the present invention and FIG. 2B is a second embodiment of such terminal having an extremely low profile such that the antenna terminal could be integrated within the roof of the vehicle with little or no protrusion above the vehicle.

FIG. 2A illustrates a first embodiment of such a terminal 225, which has an antenna and related electronics (not shown) contained within an outer shell 201 having a low profile, such that the shell 201 can be externally mounted to the roof 251 of the vehicle 250 with little or no protrusion above the vehicle. This terminal could employ, for example, the electro-mechanically steered antenna of the type disclosed in the patent application U.S. Ser. No. 10/752,088 entitled Mobile Antenna System for Satellite Communications." Alternatively, the shell can contain a flat (or very low thickness) phased array system comprising one or more relatively thin arrays and using either electromechanical steering or all electronic steering to track the satellites, such as the electronically steered antenna of the type disclosed in the patent application entitled "Flat Mobile Antenna," which was filed as a PCT application (PCT/BG/04/00011) and designates the U.S. for national stage filing.

The components within the shell 201 are coupled by cables 202 to an interior unit 203, which can contain the components necessary for data and video processing that can be off-loaded in order to reduce the profile of the shell 201. The interior unit can be coupled by the cables 202 to a video display 206 or jack for a computer or other data interface device. As illustrated in FIG. 2A, the system could include a wireless two-way connection 204 for coupling to a laptop 205 or similar device.

Figure 2B:
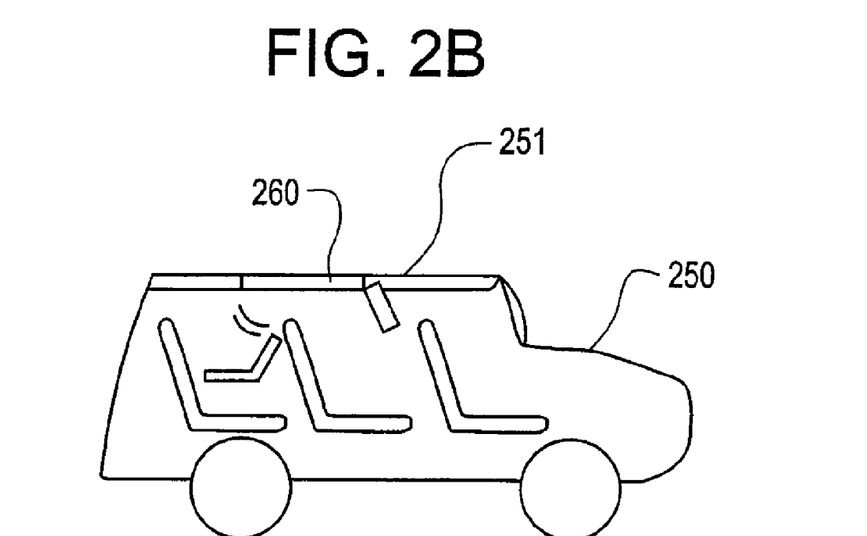

Another embodiment comprises an antenna panel (phased array) with fully electronic beam steering, along with polarization adjustment, of the type already mentioned. An extremely low profile of antenna package can be achieved, allowing antenna terminal integration within the vehicle roof. With reference to FIG. 2B, there is illustrated a cross section of a vehicle 250 having an antenna 260 that is integrated into the roof 251 of the vehicle 250, and is electro-mechanically or electronically steerable in both azimuth and elevation. The antenna could either be mounted so that its top is substantially coplanar with the vehicle roofline, requiring the antenna's minimal depth to be accommodated within the space between the roof and the vehicle cabin, or mounted so that its depth appears as a slight bulge in the roofline. The mounting to a standard vehicle in either case would be achieved by cutting a hole in the roof and affixing the antenna into the hole, with appropriate interior and exterior finishes and gaskets, much in the same manner that sun roof's are added to standard vehicles. The top surface would have an appropriate coating or covering that would be weatherproof and durable, yet offer minimal interference with the transmission or reception of signals to and from a satellite. The steerable antenna would be coupled to internal electronics (not shown), display and data interface or processing equipment through wired or wireless connections, in the same manner as in FIG. 2A.

The proposed low profile antenna terminal meets the above-mentioned objective, comprising low profile transmit and receive antennas, beam control system, sensors, down and up converters, modems, radio frequency (RF) power amplifiers, and interface with data and TV receivers.

It is clear that similar terminals for different frequency bands, e.g. portions of the bands available in Europe and elsewhere in the world (e.g., 10.7-12.75 GHz for reception and 13.75-14.5 GHz for transmission), are included within the field of this invention.

Such a system that functions as a low-profile in-motion low-profile VSAT and DBS reception system is not presently available.

The low profile transmit and receive antennas comprise one or several flat antenna arrays, in the form of panels according to a non-limiting example, each containing a plurality of dual port radiating elements (patches, apertures etc.), passive summation circuits and active components. Each antenna array has two independent outputs each one dedicated to one of the two orthogonal linear polarizations. In case of a multi-array or multi-panel antenna embodiment, signals coming or going to the different antenna arrays are phased and summed or divided by final combining block, with phase and amplitude controlling components.

The signals from the two antenna outputs with two orthogonal linear polarizations are then processed in polarization control devices in order to adjust the polarization tilt in case of linear polarization. Such adjustment may be implemented by using the information for antenna terminal position with respect to the selected satellite, received by a GPS device and for the vehicle inclination angle, received, for example, by an inclination sensor. At the same time, receive panel outputs are processed for circular polarization in the case of U.S. DBS reception. Another possibility for providing a polarization adjustment is to use the −3 dB symmetrical points (45 degree tilt) or by checking the antenna cross polarization at the hub station.

By one embodiment, the signals coming from the receive antenna outputs are divided and applied to two independent down converters comprising the polarization forming circuits and dedicated to reception separately in the FSS and DBS/BSS bands. It is convenient to form two orthogonal linear polarizations with adjustable polarization offset for processing the signals in the FSS band and at the same time two circular polarizations for processing signals in the DBS/BSS band.

By another embodiment transmit and receive antennas are arranged on the same rotating platform in order to ensure exact pointing to the selected satellite using tracking in receive mode.

It is useful to stack the signals at first intermediate frequency, connected with the two (LH and RH) circular polarizations, coming out of the two DBS down converters, and to transfer them to the static platform of the terminal using one and the same rotary joint device.

By another embodiment the signal transfer between static and rotary platform is made using a wireless connection (using for example Wi-Fi or Bluetooth technology) thereby eliminating the need for a rotary joint for the continuously rotatable azimuth platform.

By another embodiment the connection between outdoor unit set top box and the indoor equipment in the vehicle also may be accomplished using wireless technology (for example Wi-Fi or Bluetooth technology)

The beam pointing is accomplished by mechanical rotation in azimuth plane of the platform, comprising transmit and receive antenna panels, and by mechanical, electronic or mixed steering in the elevation plane. In certain cases, beam steering in azimuth and elevation could also be accomplished by entirely electronic means.

The motors or electronic steering components are controlled by a CPU using the information, supplied by the direction sensor (such as a "gyro") and received signal strength indicator (RSSI) blocks.

The preferred application for the invention is a low profile antenna terminal, of the type schematically illustrated in FIGS. 2A and 2B, for in-motion two-way communications and simultaneous TV signal reception from a satellite at the same geo-stationary orbit or, orbits for the FSS and BSS functions.

The terminal 120 consists of a low profile antenna 125, rotating platform 11, static platform 13 and indoor unit 14. The rotating platform comprises: transmit (Tx) 30 and receive (Rx) 31 sections. The preferred shape of the antenna 125 comprises thin arrays, in a non-limiting embodiment flat panels, in order to decrease the overall height of the overall system. A terminal based on reflectors or lenses is feasible but generally will occupy a larger volume on the vehicle and may be less attractive.

The antenna array may be a panel constructed using phased array antenna technology and comprising a plurality of dual port radiating elements (e.g., the antenna panel architecture and technology used are described in detail in the patent application "Flat Mobile Antenna" PCT/BG/04/00011), designed to work in transmit mode in the 13.75-14.5 GHz frequency band, which is incorporated herein by reference.

Figure 3:
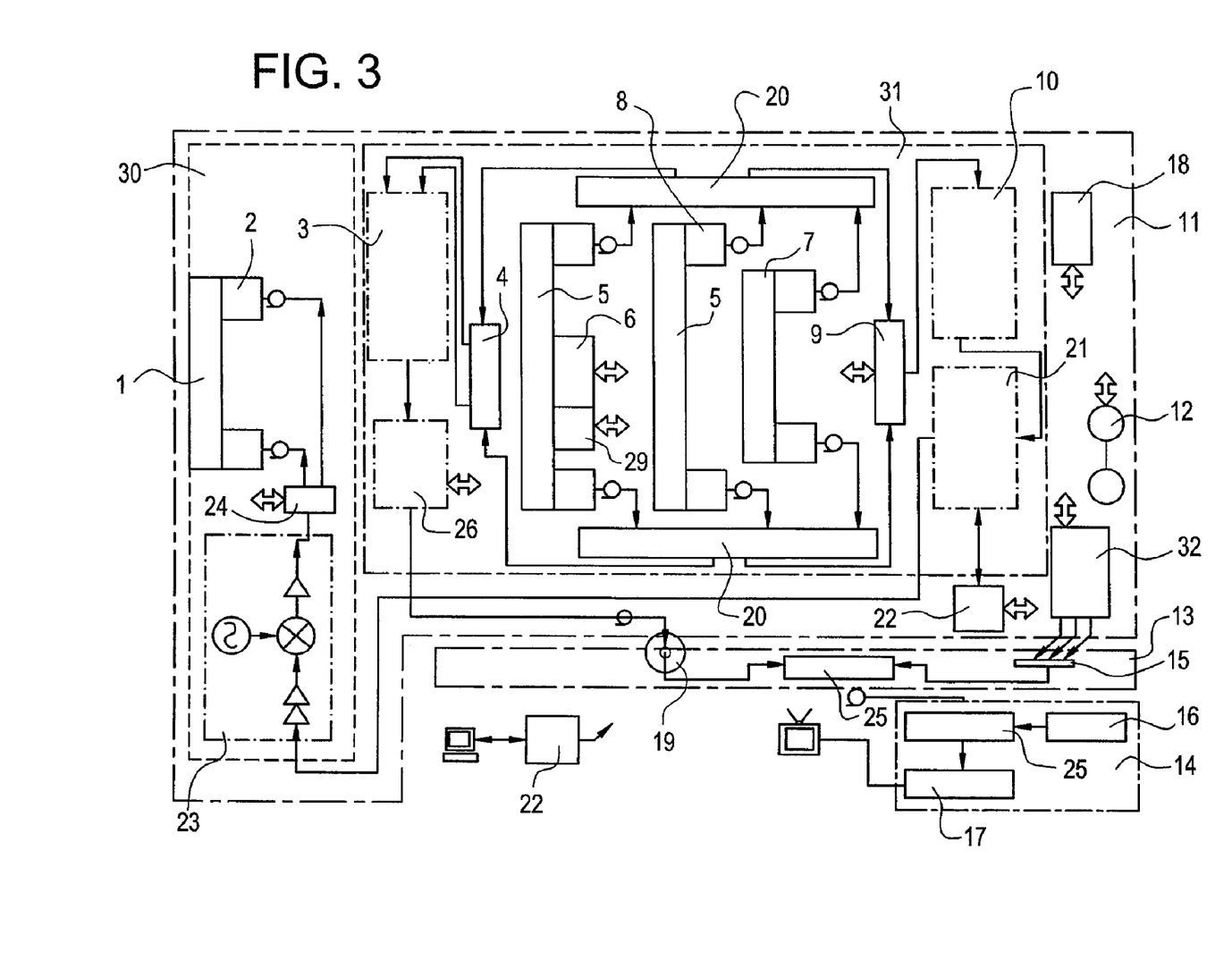
FIG. 3 illustrates block diagram of the mobile antenna terminal in accordance with the embodiment of the invention.
Figure 5:
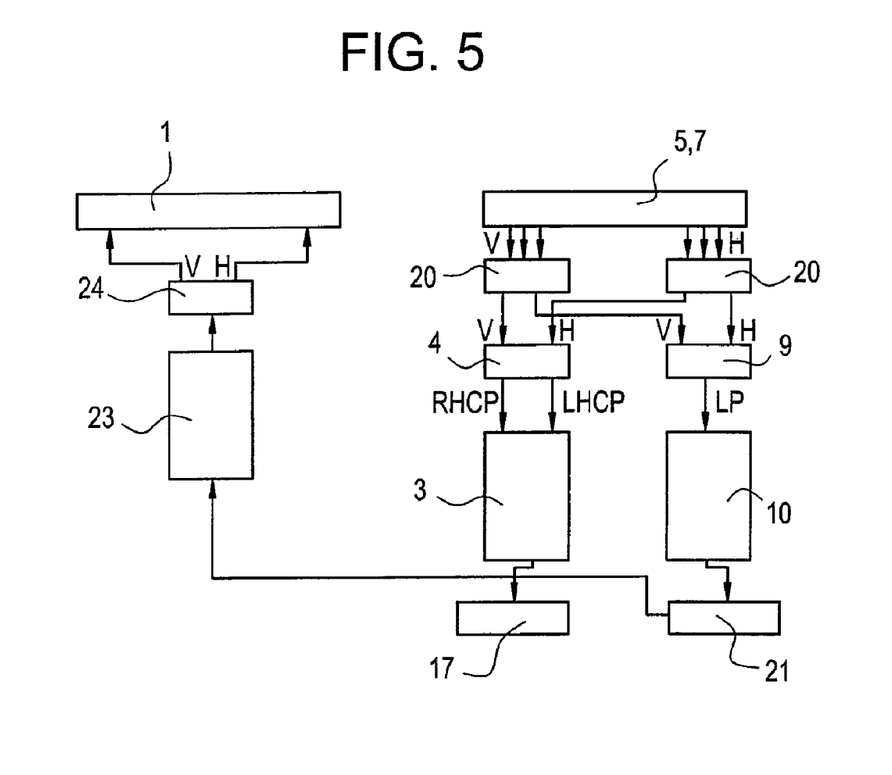
FIG. 5 illustrates signal flow through the various components on the Rx and Tx sides for both bands, including an illustration of the splitting of received signals.

As illustrated in FIGS. 3 and 5, the transmit section comprises a flat active antenna array 1, polarization control device 24 up converter unit 23. High power amplifiers (HPA) 2 modules are integrated directly to each one of the array inputs in order to minimize signal losses between the up-converter unit 23 and radiating elements of the array 1. The transmit signal formed in the IF/baseband transceiver block 21, which also is disposed on rotating platform 11, is up converted in a standard up-converter unit 23 and then transferred through polarization control device 24 to the transmit panel inputs. The polarization control unit 24 comprises electronic controlled phase controlling devices and attenuators, which are operative to control the amplitude and phase of the signals applied to each one of the antenna array inputs (or integrated with the antenna array/sub array elements). The vertical (V) and horizontal (H) polarized outputs of the polarization control unit 24 are connected properly through two independent feed networks to each one of the two port sets of the dual port radiation elements. This arrangement, can effect control of the polarization tilt of the transmitted linearly polarized signals. Specifically, the required polarization offset can be established, depending on the vehicle location with respect to the selected satellite, using the information from a GPS module 18 and possibly an inclination sensor 29. Polarization tilt information may also be obtained by monitoring the cross polarized channels of the satellite.

With reference to the illustration in FIGS. 3 and 5, receive section 31 consists of a multi panel receive antenna array, implemented in the exemplary illustrated embodiment by two relatively "large" array 5 and one relatively "small" array 7, all situated on the same rotating platform 11 with the transmit array 1. All of the arrays, particularly when implemented as panels, are aligned properly to have exactly the same directions of the main beams, wherein the arrays 5 and 7 have an extended frequency band of operation in order to cover simultaneously both FSS (11.7-12.2 GHz) and DBS (12.2-12.7 GHz) bands, as an example for the U.S. operation. Low noise amplifiers (LNAs) 8 are connected to the each one of the panel's outputs/polarizations in order to compensate for losses in combining and phasing blocks 20. The elevation angles and the distances between the receive panels are controlled by the elevation mechanics 12 in order to achieve best performance in the entire elevation scan range. The principles of operation and construction of such type of multi-array or multi-panel antenna receive system are disclosed in the patent application U.S. Ser. No. 10/752,088 Mobile Antenna System for Satellite Communications, the disclosure of which is incorporated herein by reference.

Figure 4:
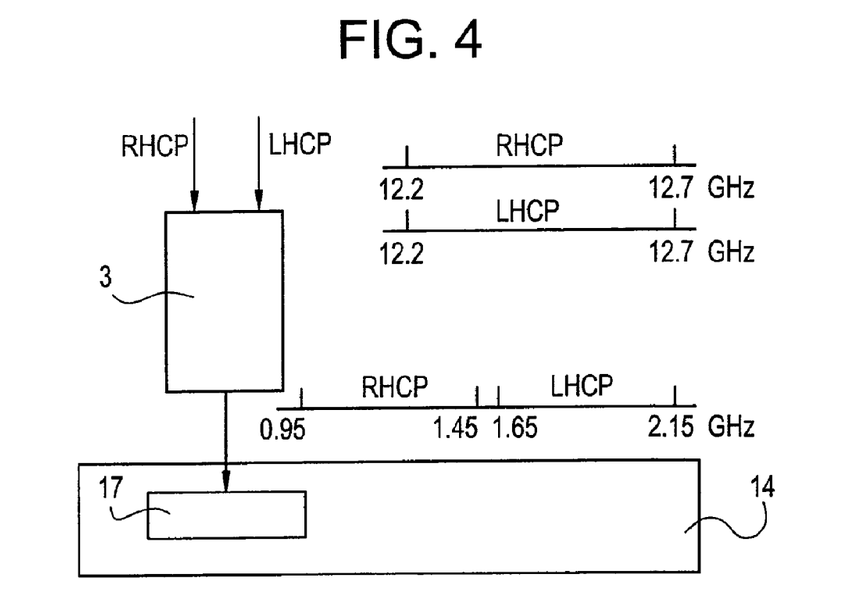
FIG. 4 is a schematic illustration of the flow of circularly polarized signals that are received by the mobile antenna terminal in accordance with the present invention frequencies.

The two combining and phasing blocks 20, each one dedicated to one of the two independent linear polarizations (designated as V-vertical and H-horizontal) is operative to properly phase and combine the signals coming from the antenna panels outputs and to supply H-polarized and V-polarized signals to the polarization control device 9 and polarization forming device 4. Polarization control device 9 is operative to control and match the polarization offset of the linearly polarized FSS signals with respect to the satellite position, using the information supplied by GPS module 18 and possibly the inclination sensor 29. Polarization forming device 4 is operative to form a left hand circular polarization (LHCP) and a right hand circular polarization (RHCP) in order to process the DBS signals. The RHCP and LHCP signals are provided to down converter 3, and then forwarded to the receiver 17 in the indoor unit 14, as illustrated in FIG. 4. In another embodiment, the DBS receiver could be located with the outdoor terminal equipment and a digital wired or wireless connection be enabled to the indoor video display.

The down converter 10 receives the FSS signals, while the down converter 3 receives the DBS signals. In one non-limiting but exemplary implementation, a rotary joint 19 is used to supply down converted signals coming from the DBS down converter 3 to the indoor unit. The signals, which relate to the left hand (LH) and right hand (RH) polarizations, are stacked in frequency using a stacker circuit, integrated into the DBS down converter 3, in order to use one and the same rotary joint unit 19. The IF signals coming from the FSS down converter 10 are supplied to the IF/baseband transceiver block 21, which is connected to the indoor equipment (inside the vehicle). Preferably, the connection is wireless, employing wireless modules 22.

A received signal strength Indicator (RSSI) and recognition module 26 and the IF/baseband transceiver block 21 are connected to the FSS down converter 10 and the up converter 23, and all may be arranged on the same rotation platform.

As illustrated in FIG. 3, a low cost gyro sensor block 6 may be placed on the back of one of the receive panels and will be operative to provide information about the platform movement to the digital control unit 32. The digital control unit 32 is operative to control all motors 12 for beam steering in azimuth and elevation, polarization controlling devices 24 and 9, phase combining and phase control blocks 20, comprising interfaces to the gyro sensor block 6, inclination sensor 29 and indoor unit 14.

The static platform comprises DC slip rings 15 in order to transfer DC and digital control signals to the rotating platform, static part of the RF rotary joint 19, part of the azimuth movement mechanics, DC power injector 25 and the terminal supporting structure, which typically is in the form of a case.

The indoor unit 14 includes digital and DC power supply interface 16, satellite receiver 17 and power injector 25 in order to supply DC to the outdoor unit.

In the VSAT system for data communications, a digital interface may be provided for PC, telephone line, and the like, either on the rotating platform or in the vehicle.

Figure 6:
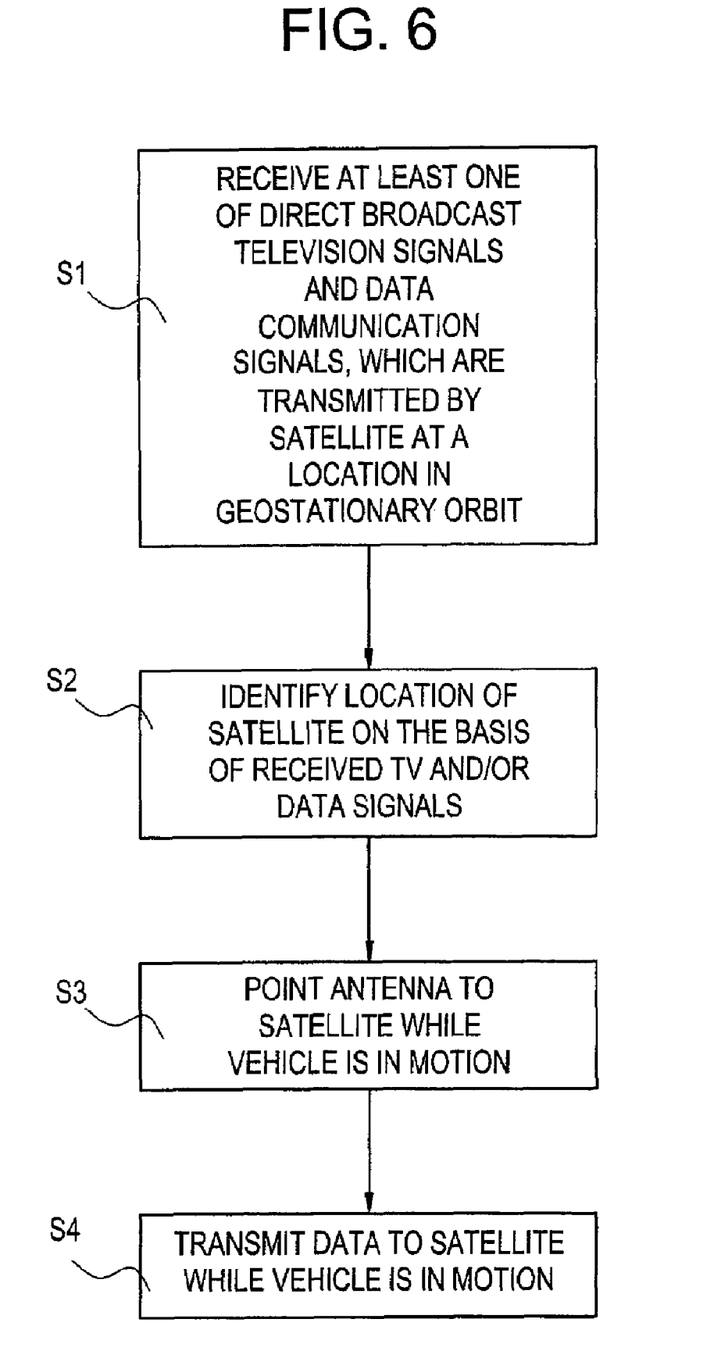
FIG. 6 illustrates a flow chart of an exemplary process performed in the implementation of the present invention.

The communications terminal as disclosed herein can operate in a manner that can provide in-motion mobile communication for direct broadcast satellite television reception and two-way data communication. According to the method, as illustrated in FIG. 6, at an antenna coupled to a mobile terminal mounted on a vehicle in motion (e.g., car, truck, or the like suitable for carrying a low profile antenna), at least one of direct broadcast television signals and data communication signals, which are transmitted by satellite at a location in geostationary orbit, are received (step S1). At the mobile terminal the orbital location of the one (or more satellites in substantially the same location, within the beam width of the mobile terminal antenna) is identified (step S2), preferably using an RSSI module or similar location identification technique, on the basis of received TV or data signals. Then (step S3), the (preferably low profile) antenna on the terminal is adjusted in at least one of azimuth and elevation so that it is pointed to the orbital location of the satellite(s) while the vehicle is in motion. Finally, data is transmitted to the satellite(s) from the antenna while the vehicle is in motion (step S4). Preferably, the terminal is adapted to concurrent reception of data and television signals.

The foregoing embodiments and advantages are merely exemplary and are not to be construed as limiting the present invention. The description of the present invention is intended to be illustrative, and is not intended to limit the scope of the claims. Many alternatives, modifications, and variations will be apparent to those skilled in the art.

The invention claimed is:

1. A mobile terminal system configured to concurrently communicate by at least one antenna with (1) one satellite disposed at a geostationary orbital location and providing both TV broadcast and two-way data communications or (2) at least two satellites located at substantially the same geostationary orbital position, with one satellite providing TV broadcast and another satellite providing two-way data communications, said terminal system comprising: a transmit/receive system coupled to said antenna and comprising a transmitter and receiver operative to provide two-way type data communication using a first frequency band with said one satellite, and a receive system coupled to said antenna and comprising a receiver operative to receive TV signals from said same or other satellite; wherein the antenna is adapted for integration into a roof of a mobile vehicle and adjustable in both azimuth and elevation or the antenna is mountable on a mobile vehicle and is adjustable in at least an azimuth, wherein the antenna comprises at least one transmit antenna array or receive antenna array.

2. The mobile terminal system of claim 1, wherein the antenna is adapted for integration into a roof of a mobile vehicle, is electro-mechanically or electronically adjustable, and has at least one flat antenna array operative for at least one of transmission and reception of signals from at least one satellite.

3. The mobile terminal system of claim 1, wherein the antenna is mountable on a mobile vehicle and comprises at least one multi-panel array operative for at least one of transmission and reception of signals from at least one satellite.

4. The mobile terminal system of claim 1, wherein the antenna is mountable on a mobile vehicle and comprises at least one array for transmit and at least one array for receive.

5. The mobile terminal system of claim 1, wherein the antenna is mountable on a mobile vehicle, is adjustable in azimuth and elevation, and comprises at least one phased array antenna panel with electronic beam steering in an elevation plane.

6. The mobile terminal system of claim 1, further comprising:
a phase controlling and combining block operative to provide phasing and summation of the signals coming from a plurality of antenna array outputs.

7. The mobile terminal system of claim 6, further comprising a polarization control block operative to control and adjust a polarization tilt offset for linearly polarized signals reception.

8. The mobile terminal system of claim 7, wherein the said polarization control block comprises at least one electronically controlled phase controlling device and at least one attenuator.

9. The mobile terminal system of claim 7, further comprising a polarization forming block operative to form left hand (LH) and right hand (RH) circular polarizations in order to process the TV signals.

10. The mobile terminal system of claim 7, further comprising a plurality of down converters, at least one down converter being operative for FSS and a second down converter being operative for DBS signal processing.

11. The mobile terminal system of claim 10, further comprising means for stacking IF signals for different circular polarizations, coming from the outputs of said DBS down converter.

12. The mobile terminal system of claim 11, wherein the IF signal from the output of the said down converter for FSS signals is transferred to an IF/baseband transceiver block arranged on the same rotating platform.

13. The mobile terminal system as recited in claim 1, further comprising at least one high power amplifiers, said amplifier being integrated directly to an input of the transmit antenna array.

14. The mobile terminal system as recited in claim 13, further comprising a polarization control unit operative to control linear polarization tilt offset of the signals transmitted by the transmit antenna array.

15. The mobile terminal system as recited in claim 14, wherein said polarization control unit comprises at least one electronically controlled phase controlling device and at least one attenuator.

16. The mobile terminal system as recited in claim 15, further comprising an up converter, said up converter being connected to an IF/baseband transceiver, arranged on a same rotating platform.

17. The mobile terminal system as recited in claim 1, wherein the at least one transmit and receive antenna arrays are disposed on a common rotating platform, whereby main beams of said arrays may be pointed in the same direction.

18. The mobile terminal system as recited in claim 17, further comprising a gyro sensor and an RSSI module, wherein transmit antenna tracking is accomplished using the tracking information received in a receive mode using said gyro sensor and said RSSI module.

19. The mobile terminal system as recited in claim 18, further comprising a central control unit, wherein the transmission mode is allowed by said central control unit only when an acquisition process is completed and a selected satellite is locked by a tracking system in receive mode.

20. The mobile terminal system as recited in claim 1, wherein at least one of a Bluetooth or other wireless connection is used between an outdoor set top box of said terminal and indoor equipment installed in the vehicle.

* * * * *